US008894864B2

(12) United States Patent
Karrs et al.

(10) Patent No.: US 8,894,864 B2
(45) Date of Patent: Nov. 25, 2014

(54) CONTROLLED METHOD OF MINIMIZING RADIOACTIVE SLUDGE GENERATION IN POST STIMULATION FLOWBACK AND/OR PRODUCED WATER TREATMENT FROM A SALTWATER, OIL AND/OR GAS WELL

(75) Inventors: Stanley R. Karrs, Gibsonia, PA (US); Richard A. Altman, Kingwood, TX (US)

(73) Assignee: Evoqua Water Technologies LLC, Warrendale, PA (US)

( * ) Notice: Subject to any disclaimer, the term of this patent is extended or adjusted under 35 U.S.C. 154(b) by 685 days.

(21) Appl. No.: 13/204,849

(22) Filed: Aug. 8, 2011

(65) Prior Publication Data
US 2012/0037568 A1    Feb. 16, 2012

Related U.S. Application Data

(60) Provisional application No. 61/372,387, filed on Aug. 10, 2010.

(51) Int. Cl.
*C02F 1/52*   (2006.01)
*C02F 5/02*   (2006.01)
*C02F 5/00*   (2006.01)
*C02F 101/00* (2006.01)
*C02F 103/08* (2006.01)
*C02F 103/10* (2006.01)

(52) U.S. Cl.
CPC ......... *C02F 1/5236* (2013.01); *C02F 2209/001* (2013.01); *C02F 1/5209* (2013.01); *C02F 2209/005* (2013.01); *C02F 5/02* (2013.01); *C02F 5/00* (2013.01); *C02F 2101/006* (2013.01); *C02F 2103/08* (2013.01); *C02F 2103/10* (2013.01); *C02F 2301/08* (2013.01); *Y10S 210/912* (2013.01)
USPC ........... 210/709; 210/710; 210/717; 210/726; 210/96.1; 210/912

(58) Field of Classification Search
CPC ........ C02F 1/5209; C02F 1/5236; C02F 5/02; C02F 5/06; C02F 2101/006; C02F 2103/08; C02F 2103/10; C02F 2209/001; C02F 2209/005; C02F 2301/08; E21B 43/34
USPC .............. 210/709, 710, 716, 717, 726, 747.1, 210/96.1, 912; 166/267, 308.1; 423/2; 588/18, 20
See application file for complete search history.

(56) References Cited

U.S. PATENT DOCUMENTS

| 4,127,989 | A  | * | 12/1978 | Mickelson | 166/267 |
|---|---|---|---|---|---|
| 4,423,007 | A  | * | 12/1983 | Weir et al. | 423/2 |
| 4,636,367 | A  | * | 1/1987 | Huck et al. | 423/12 |
| 5,641,408 | A  | * | 6/1997 | Delloye et al. | 210/717 |
| 7,481,918 | B2 | * | 1/2009 | Morrison et al. | 210/96.1 |
| 2002/0113020 | A1 | * | 8/2002 | Debreuille et al. | 210/709 |
| 2009/0255876 | A1 | * | 10/2009 | Dunbar | 210/709 |

* cited by examiner

*Primary Examiner* — Christopher Upton

(57) ABSTRACT

Disclosed herein is a controlled method of minimizing radioactive sludge generation in treatment of wastewater from an oil and/or gas well. The method comprises measuring a concentration of a radioactive material in wastewater to be treated and measuring a concentration of barium in the wastewater to be treated. The method further comprises adding a calculated quantity of sulfate to the wastewater to be treated sufficient to precipitate a quantity of barium sufficient to reduce the concentration of the radioactive material to a level such that sludge precipitated in a secondary precipitation has a radiation level below a defined radiation level.

11 Claims, 1 Drawing Sheet

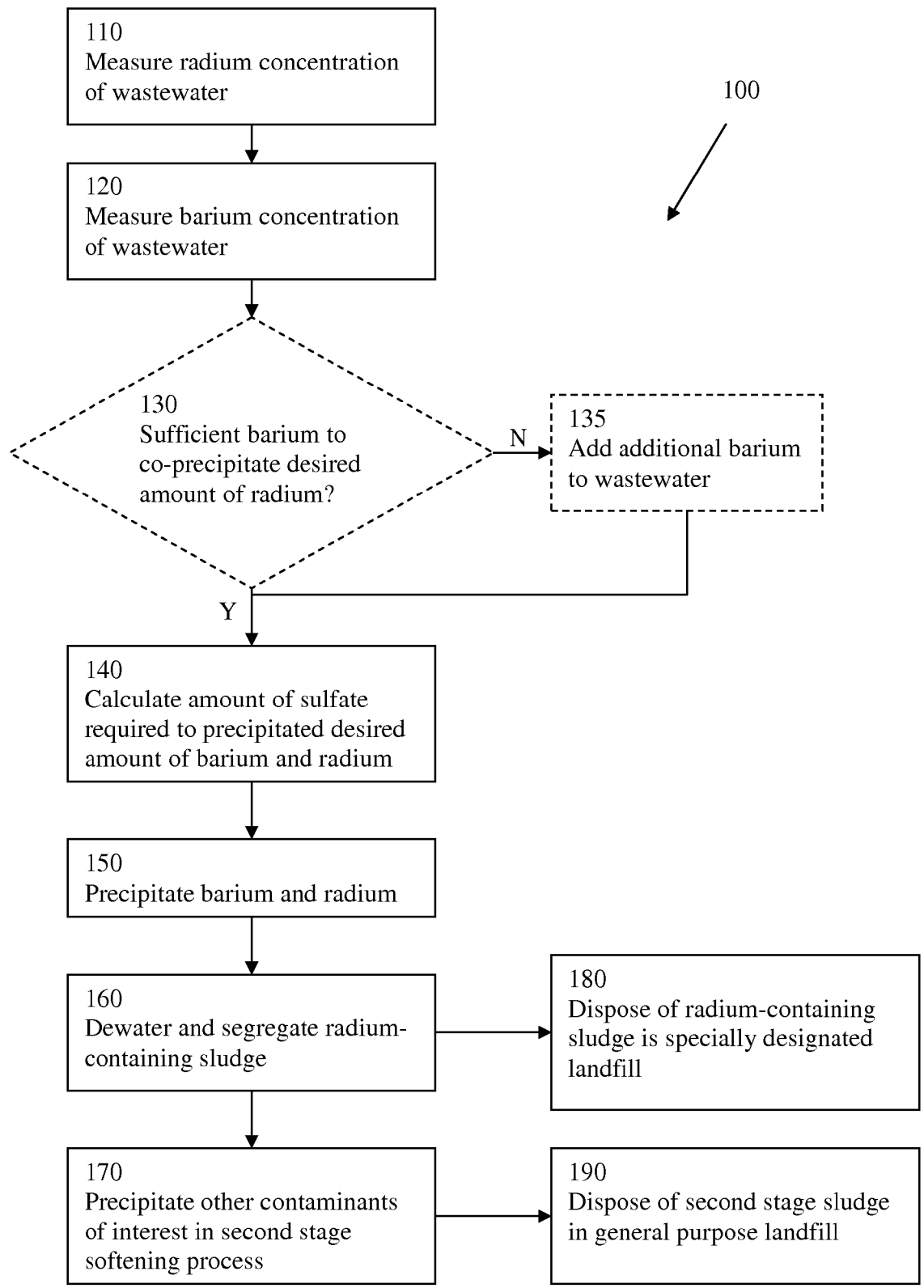

CONTROLLED METHOD OF MINIMIZING RADIOACTIVE SLUDGE GENERATION IN POST STIMULATION FLOWBACK AND/OR PRODUCED WATER TREATMENT FROM A SALTWATER, OIL AND/OR GAS WELL

RELATED APPLICATIONS

This application claims priority under 35 U.S.C. §119(e) to U.S. Provisional Application Ser. No. 61/372,387, titled "CONTROLLED METHOD OF MINIMIZING RADIOACTIVE SLUDGE GENERATION IN POST STIMULATION FLOWBACK AND/OR PRODUCED WATER TREATMENT FROM A SALTWATER, OIL AND/OR GAS WELL," filed on Aug. 10, 2010, which is herein incorporated by reference in its entirety.

SUMMARY OF INVENTION

The current application applies generally to reducing the total volume and/or concentration of radioactive material from precipitation processes and final sludge generation utilized in the treatment of wastewater (flowback and/or produced water) produced during hydraulic fracturing operations in natural gas mining. Flowback water is water which may discharge from a freshly drilled gas well shortly after the well undergoes hydraulic fracturing. Flowback water may contain high levels of chemicals that may have been introduced with fluid used to hydraulically fracture the well. After the well becomes a producing well, water which continues to discharge from the gas well is considered produced water. The level of hydraulic fracturing chemicals in produced water may decrease with time.

Aspects and embodiments of the present invention include acts of precipitating barium and a defined amount of radium from the wastewater prior to a secondary precipitation of additional components from the wastewater. The barium may be precipitated by reacting a defined amount of sulfate with the wastewater to form a barium sulfate precipitate.

Radium 226 (Ra 226) and radium 228 (Ra 228) has a strong tendency to bond to barium sulfate. Controlling the amount of barium sulfate created during an initial precipitation process in the treatment of hydraulic fracturing wastewater may result in the co-precipitation of substantially all available radioactive material (for example, Ra 226 and/or Ra 228) present in the wastewater. Such a method could facilitate the reduction in the total volume of barium sulfate sludge created and also co-precipitate substantially all the radioactive material from hydraulic fracturing wastewater, leaving the remaining fluid substantially free of radioactive material.

Laboratory testing was conducted with representative hydraulic fracturing wastewater samples. Varying amounts of reaction agents were utilized to form varying quantities of barium sulfate precipitate; the levels of residual radioactive material left behind in the fluid samples validated that the precipitation/radioactive bonding process could be controlled to precipitate out a desired amount of radioactive material from the wastewater samples.

After precipitation of the barium sulfate material from the wastewater samples there was little or no residual Ra 226 or Ra 228 radioactive material left in the remaining fluid. Further chemical precipitation processes utilized to form other compounds, designed to remove other remaining dissolved solids, would have little if any radioactive material in their final precipitated compounds. This would allow for a greater fraction of total sludge generated to be free of radioactive material.

This unique methodology would facilitate sludge disposal without concerns of triggering existing radiation monitors located at landfills; methods in accordance with the present invention could produce sludge having radiation levels under the 10 microrems per hour of decay used as a triggering setpoint on some examples of these monitors. These methods would also facilitate the disposal of radioactive sludge by blending of the smaller volume of radioactive sludge produced with a sufficient amount of materials containing fewer or no radioactive contaminants so as to meet or exceed safe radiation levels for disposal at landfills.

Embodiments of the process disclosed herein include testing wastewater for dissolved solids and levels of radioactive materials such as Ra 226 and/or Ra 228 present. Based on the findings of the tests, an amount of chemical reactive agents desired to be used to treat the wastewater could be determined. The amount of precipitants formed and the chemical usage could thus be controlled, facilitating an increased chemical usage efficiency within the wastewater treatment process and/or facility.

An embodiment of the present invention is directed to a controlled method of minimizing radioactive sludge generation in post stimulation flowback and/or produced water treatment from a saltwater, oil, and/or gas well. The method comprises measuring a concentration of a radioactive material in wastewater to be treated comprising flowback and/or produced water. The method further comprises measuring a concentration of barium in the wastewater to be treated. A calculated quantity of sulfate is added to the wastewater to be treated. The calculated quantity is sufficient to reduce the concentration of the radioactive material to a level such that a second sludge precipitated in a secondary precipitation has a radiation level below a defined radiation level. The method further comprises precipitating barium sulfate and the radioactive material from the wastewater to be treated to form a radioactive sludge and a partially treated wastewater, and performing the secondary precipitation on the partially treated wastewater to form the second sludge and a treated wastewater.

In accordance with some aspects of the present invention, if sufficient barium is not present in the wastewater to be treated to achieve a desired radiation level in the second sludge, additional barium, in some aspects in the form of barium chloride ($BaCl_2$), may be added to the wastewater prior to adding sulfate to facilitate producing the second sludge with a desired radiation level.

In accordance with some aspects of the present invention, the radioactive material is one of radium and cesium.

In accordance with some aspects of the present invention, the secondary precipitation comprises softening. The softening may comprise contacting the partially treated wastewater with one or more of caustic soda (NaOH), soda ash ($Na_2CO_3$), and lime ($Ca(OH)_2$).

In accordance with some aspects of the present invention, the defined radiation level is about 10 microrem per hour.

In accordance with some aspects of the present invention, the method further comprises blending a quantity of the radioactive sludge with a quantity of the second sludge to produce a third sludge, the ratio of the quantity of the radioactive sludge to the quantity of the second sludge selected such that the third sludge has a radiation level at or below a second defined radiation level. In accordance with some aspects of the present invention, the second defined radiation level is about 10 microrem per hour.

In accordance with some aspects of the present invention, the method further comprises measuring a concentration of dissolved solids in at least one of the wastewater to be treated and the partially treated wastewater.

In accordance with another embodiment of the present invention there is provided a computer-readable storage device. The computer-readable storage device contains a set of instructions which when executed on a controller of a wastewater treatment system configured to treat wastewater including post stimulation flowback and/or produced water from a saltwater, oil, and/or gas well causes the controller to perform a method comprising adding a calculated quantity of sulfate to the wastewater sufficient to reduce a concentration of radioactive material in the wastewater to a level such that a second sludge precipitated in a secondary precipitation has a radiation level below a defined radiation level, precipitating barium sulfate and the radioactive material from the wastewater to form a radioactive sludge and a partially treated wastewater, and performing the secondary precipitation on the partially treated wastewater to form the second sludge and a treated wastewater.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is flow diagram of a method in accordance with an embodiment of the present invention.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Changes in drilling and recovery technologies now allow energy companies to access an estimated 90-year supply of natural gas in North America. There are an estimated 142 unconventional gas basins in the United States, for example, oil shale basins such as the Marcellus shale basin in Pennsylvania and western New York. Similar natural gas mining operations are being initiated in Australia, Russia, Germany, the Middle East, and the Gulf of Mexico. A hydraulic fracturing process is often employed to facilitate the recovery of natural gas from natural gas basins.

There is a water supply chain associated in developing natural gas basins. Hydraulic fracturing requires fresh water be found and transported to the production site. In some facilities it may require up to 8,000,000 gallons to hydraulically fracture a well. Water is typically delivered in trucks, 4,200 gallons at a time. Approximately 20% to 60% of the water may be recovered as "flowback" which typically needs to be treated prior to re-use or disposal. Water disposal represents operating costs. Water management methods include reinjection, reuse, and surface discharge. In some facilities, water management may be the single biggest expense in gas production, with water disposal costing between $10 and $15 per 42 gallon barrel. Federal, state and local regulations are restricting access to fresh water and imposing stricter requirements for brine disposal. Federal legislation in the United States includes the "FRAC" Act Bill (S-1215, introduced in the 111th Congress, Jun. 9, 2009 and reintroduced as S-587 in the 112th Congress, Mar. 15, 2011) that would impose restrictions and require disclosure relating to fracturing chemicals. Colorado recently imposed regulations for disposal of produced water. Arkansas, New Mexico, and Wyoming have also updated produced water management standards.

Natural gas producers may acquire water for the stimulation of natural gas production from, for example, ponds, lakes, and municipal effluent. In water rich formations, produced water (PW) may need to be treated to a discharge standard. In certain formations, the PW has such a high salt content that treatment processes such as reverse osmosis or thermal evaporation may be necessary to meet total dissolved salt levels required for surface water discharge (see Tables 1A and 1B below for typical shale fracture water data). Regulations allow hydraulic fracturing wastewater to be reused at another well site; however, the buildup of certain contaminants can result in scale formation in the next well which lowers the productivity of the well and/or the life of the well. Contaminants such as barium, calcium, iron, strontium, oil, grease, and suspended solids are compounds of concern (see Table 2 below).

The industry is moving to coarse precipitation of contaminants as a method for facilitating hydraulic fracturing wastewater reuse. The volume of water required for each well may not justify the construction of an on-site treatment facility. The capital costs for treatment for a well site are reduced by using one of two approaches; central facilities which require the produced water to be transported to a centralized site for treatment prior to reuse or mobile treatment plants which move from site to site.

Centralized facilities can be shared or dedicated. In some operations, shared facilities propose to receive water from a number of producers and extract opportunity by intersecting water disposal routes. Water to be treated is transported by truck to a centralized treatment facility, treated and stored, and sent to the next drilling site for reuse. In some locations, dedicated facilities process the water from a single producer. They are bound by large lease holdings with a longer time horizon. These systems offer optimized assets, economies of scale and homogenous product water. Centralized facilities are typically capital projects with ongoing services contracts.

Mobile systems are often smaller in design than centralized facilities. Mobile systems may be co-located to production assets and relocated as needed. Mobile systems may extract value by reducing or eliminating the need to transport flowback away from a drilling site, but may lack a consistent water quality. Mobile systems are sometimes supplier owned and operated.

Both centralized treatment facilities and mobile systems are sometimes focused on barium removal since barium tends to supersaturate and form a scale that is difficult to remove from wells and/or natural gas extraction equipment. Both types of plants may generate considerable quantities of sludge from the water treatment processes that is in some cases disposed of in a landfill.

One complicating factor that impacts both of these types of facilities is that in certain formations naturally occurring radioactive material (NORM) is observed in the to produced and/or flowback water. This radioactive material is found in a wide range of concentrations in waters through a typical shale region. The chief component of NORM is typically Ra 226 and to a lesser extent Cesium 137.

One mobile treatment approach used for barium removal is sulfate precipitation by using sodium sulfate, sulfuric acid, or some other sulfate compound to precipitate the barium as barium sulfate. This has the unfortunate side effect of removing the bulk of the radioactive content present as a radium co-precipitate with the barium sulfate precipitated. The sludge generated from this type of process can easily contain high enough levels of radioactivity (sometimes up to about 270 picocuries/gm (pCi/gm) or above) to create a class 7 radioactive waste which requires special handling, including disposal in costly landfills specially designated for radioactive waste. Even if the waste has less than about 270 pCi/gm of radioactivity, in some states, for example, Texas, Louisiana, and Arkansas, waste with radioactivity levels as low as 30 pCi/gm can require special handling due to state regulations.

Alternately, produced and/or flowback water may be treated by lime/soda ash softening and/or caustic soda/soda ash softening. With the softening approach, better quality water for reuse is produced, but significantly more sludge may be created than in a sulfate removal process. In both types of softening, barium is precipitated as barium carbonate which also causes the bulk of the radioactive content of the sludge to co-precipitate. Depending on the radioactive content of the original feed water, the sludge generated can contain sufficient radioactive content to be considered a class 7 radioactive waste or it can simply contain sufficient activity to set off the radioactivity alarms (often set at about 10 microrem per hour above background) at disposal landfills which can cause the sludge to be redirected to special and more costly landfills designated to accept radioactive waste.

There is a significant overall cost differential between hauling and disposal of sludge with a high radioactive content and hauling and disposal of sludge that has a radioactive content low enough to be compliant with various state regulations. For example, in Pennsylvania, landfills can be limited to accepting no more than one-half percent of the permitted capacity of the landfills as radioactive waste which exceeds a 10 microrem per hour guideline.

To control the radioactive content of the sludge generated from the treatment of hydraulic fracturing produced and/or flowback water (hydraulic fracturing wastewater) a two-step treatment process has been developed that includes controlling the partition of the radioactive content of these waste streams when, for example, full treatment of the hydraulic fracturing wastewater is desired. In some embodiments, a two-step treatment process in accordance with the present invention involves treating wastewater from a hydraulic fracturing operation to form a first sludge and a second sludge. The first and the second sludges may be formed separately and may be not intermixed. The first sludge may contain a significant amount, and in some embodiments, the majority or even the total amount of radioactive material precipitated from the hydraulic fracturing wastewater. The second sludge may contain a lesser amount of radioactive material than the first sludge, for example, less radioactive material than would result in a radioactivity level of about 10 microrems per hour, or in other embodiments, substantially no radioactive material. The first sludge may be formed by selective precipitation of radioactive material and/or compounds having an affinity for radioactive material from the hydraulic fracturing wastewater. The second sludge may be formed by precipitation of residual contaminants from the wastewater after the selective precipitation of the radioactive material. The first sludge may have a volume significantly less than the combined volume of the first and second sludges and/or may have a volume significantly less than the second sludge.

Embodiments of this two-step process utilize a modified form of a barium sulfate precipitation process as a first step followed by lime and/or soda ash softening as a second step.

An embodiment of this process is illustrated in FIG. 1, indicated generally at 100. In this approach, the incoming radium level as well as the barium level in feed water comprising hydraulic fracturing produced and/or flowback water is measured (acts 110 and 120). In act 140 a sulfate addition, as either sulfuric acid, sodium sulfate, or any other sulfate bearing compound, is then calculated to precipitate a sufficient quantity of barium to reduce the Ra 226 levels to a desired level. This desired level may be sufficiently low that sludge precipitated in the second step of the process is below a target goal, for example, having a radiation level of below about 10 microrem per hour. In act 150 a desired amount of barium and radium is precipitated from the wastewater by addition of the sulfate. The quantity of barium sulfate sludge precipitated in this first step process is removed by a clarifier or other solids separation device, then dewatered and kept segregated from sludge created in the second step process (act 160). The clarifier overflow is then directed to a second stage softening process (act 170) for removal of other scaling compounds of concern, for example, one or more of those listed in Table 2 below. In the softening process, soda ash may be the primary chemical used. To a lesser extent, lime may be utilized to control pH and excess carbonate alkalinity. The solids precipitated in the softening process may be removed in a solids contact clarifier and dewatered separately from the barium sulfate sludge.

In some situations, the level of barium contained in the feed water may not be adequate to remove sufficient Ra 226 to prevent the second stage sludge from exceeding a target radioactivity goal. This can be corrected by adding barium chloride, elemental barium, or another barium containing compound to the feed to adjust the amount of barium sulfate precipitation to a level where the Ra 226 removal will be sufficient to obtain a desired radiation level in the second stage sludge (acts 130 and 135). However, in some embodiments, the barium present in the wastewater may be more than sufficient to remove a desired amount of radium, and only a sufficient portion of the barium will be removed in the first step process to control the radiation level in the second step sludge.

The sludge including the precipitated barium and radium may then be tested for radioactivity and disposed of in a specially designated landfill if required (act 180). The sludge generated in the second stage softening process may be disposed of in a general purpose landfill (act 190). In other embodiments, at least a portion of the radium-containing sludge (the barium sulfate sludge) may be combined with at least a portion of the sludge generated in the softening process or another source of waste to produce a third sludge with a radiation level low enough to be disposed of in a general purpose landfill. This third sludge could then be disposed of in a general purpose landfill, reducing the amount of sludge that would be disposed of in a special purpose landfill designated for radioactive waste.

TABLE 1A

| Characterization of Typical Hydraulic Fracturing Wastewater | |
|---|---|
| Testing Protocol and Parameter | Results |
| EPA 150.1 | |
| pH, Standard Units | 6.53 |
| EPA 180.1 | |
| Turbidity, NTU | 130 |

TABLE 1A-continued

Characterization of Typical Hydraulic Fracturing Wastewater

| Testing Protocol and Parameter | Results |
|---|---|
| EPA 3010A | |
| ICP Liquid Metal Prep | Completed |
| EPA 365.1 | |
| Orthophosphate, mg/L as P | Not Detected |
| EPA 610B - Total | |
| Total Aluminum, mg/L | Not Detected |
| Total Barium, mg/L | 685 |
| Total Calcium, mg/L | 4,600 |
| Total Copper, mg/L | 0.0216 |
| Total Iron, mg/L | 37.3 |
| Total Magnesium, mg/L | 369 |
| Total Manganese, mg/L | 1.03 |
| Total Potassium, mg/L | 596 |
| Total Silica, mg/L as $SiO_2$ | 45.9 |
| Total Sodium, mg/L | 37,000 |
| Total Strontium, mg/L | 606 |
| Total Zinc, mg/L | 0.0224 |
| EPA 9050A | |
| Specific Conductance (EC), µS/cm | 124,000 |
| EPA 9056 - Total | |
| Total Bromide, mg/L | 346 |
| Total Chloride, mg/L | 54,800 |
| Total Nitrate, mg/L as N | Not Detected |
| Total Sulfate, mg/L | Not Detected |
| SM 2340B - Total | |
| Total hardness, mg/L as $CaCO_3$ | 13,000 |
| SM 4500CO2 - Total | |
| Bicarbonate Alkalinity, mg/L | 212 |
| Carbon Dioxide, Free, mg/L | 75 |

TABLE 1B

Characterization of Typical Hydraulic Fracturing Wastewater (continued)

| Parameter | Result | Detection Limit | Method |
|---|---|---|---|
| Gross Alpha (±Precision), pCi/l (T) | 3200 (±300) | 200 | SM 7110 B |
| Gross Beta (±Precision), pCi/l (T) | 840 (±160) | 140 | SM 7110 B |
| Radium-224 (±Precision), pCi/l (T) | 0 (±20) | 20 | SM 7500-RA-B |
| Radium-226 (±Precision), pCi/l (T) | 1600 (±200) | 100 | SM 7500-RA B |

TABLE 2

Typical Hydraulic Fracturing Water Treatment Targets

| Parameter | Target Value |
|---|---|
| Total Suspended Solids, mg/L | 10 |
| Total Barium, mg/L | 25 |
| Total Calcium, mg/L | 50 |
| Total Iron, mg/L | 5 |
| Total Magnesium, mg/L | 50 |
| Total Strontium, mg/L | 150 |

Embodiments of the methods disclosed above may be implemented in a wastewater treatment system including a controller configured to facilitate or regulate one or more operating parameters of the treatment system.

The controller may respond to signals from timers and/or sensors positioned at any particular location within the treatment system. The one or more sensors may monitor one or more operational parameters such as pH, temperature, chemical composition, and/or radiation level of the wastewater to be treated, and/or one or more characteristics of a treated water stream. The controller may respond by adjusting a rate or amount of addition of one or more precipitation agents, softening agents, pH adjustment agents, and/or a temperature of one or more treatment units in the treatment system.

The controller may be implemented using one or more computer systems which may be, for example, a general-purpose computer such as those based on an Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism may enable communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of a wastewater treatment system as disclosed herein and/or components thereof. Alternatively, the sensors, one or more metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors, for example, a program implementing one or more portions of one or more of the wastewater treatment methods disclosed above. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which can be in communication with one another through one or more networks.

Example

Testing was performed to determine the preferred treatment approach for shale flowback/produced water (the water characterized in Tables 1A and 1B) for a two step treatment process in accordance with an embodiment of the present invention.

Step 1:

The first step in the testing was focused on the removal of barium using sulfate precipitation. This step involved testing the effect of different quantities of sulfate addition on the precipitation of barium sulfate and strontium sulfate. The test protocol was as follows.

Barium and Strontium Removal Testing:

Jar tests were performed using five different sulfate ($SO_4$) doses calculated as various percentages of the stoichiometric dose of sodium sulfate to barium in aqueous solution. The tests were performed at a pH of 3. A 20 minutes reaction time was utilized. The pH adjusted samples were analyzed for barium, strontium, and sulfate after filtration through 0.45 micron filter paper.

The results for this part of the test were as follows:

TABLE 3

Barium Removal Testing Results

| Sample No. | Residual $SO_4$ (mg/L) | Ba (mg/L) | Ba % Removal | Sr (mg/L) | Sr % Removal | Sulfate % of Stoichiometric Ba |
|---|---|---|---|---|---|---|
| 1 | <10 | 685 | | 606 | | 0 |
| 2 | 31.6 | 138 | 79.9 | 533 | 12.0 | 80 |
| 3 | 47.2 | 90.5 | 86.8 | 520 | 14.2 | 90 |
| 4 | 80.7 | 43.69 | 93.6 | 514 | 15.2 | 100 |
| 5 | 205 | 13.1 | 98.1 | 496 | 18.2 | 120 |
| 6 | 369 | 5.82 | 99.2 | 502 | 17.2 | 140 |

These results show that a stoichiometric ratio of 80% sulfate to barium is effective in removing about 80% of barium from the aqueous solution. At 80% of the stoichiometric sulfate to barium level the ratio of Ba to $SO_4$ removal is about 1 to 1 (80% to 79.9%). As the $SO_4$ level increases the ratio of Ba to $SO_4$ removal decreases.

Step 2:

The tests were then repeated on raw water samples with the pH adjusted to 4, 5, 6, 7, 8, and 9. The pH of the aqueous solution was adjusted to a desired level with NaOH or HCl. An appropriate concentration of sodium sulfate was then added to achieve 90 percent of the stoichiometric amount needed to precipitate the measured quantity of barium present in the aqueous solution. The pH of the samples were adjusted with NaOH after the addition of the sodium sulfate as needed to compensate for any change in pH observed. The samples were stirred for 20 minutes and the solids were then separated by either settling and decanting or by filtering.

TABLE 4

Raw Water Characteristics

| $SO_4$ (mg/L) | Ba (mg/L) | Sr (mg/L) | pH (S.U.) | Settleable Solids (ml/L) |
|---|---|---|---|---|
| <10 | 685 | 606 | 6.5 | 26 |

TABLE 5

Treated Water Characteristics

| $SO_4$ (mg/L) | Ba (mg/L) | Ba % Removal | Sr (mg/L) | Sr % Removal | Adjusted pH (S.U.) | Settleable Solids (ml/L) |
|---|---|---|---|---|---|---|
| 43.1 | 56.2 | 91.8 | 582 | 4.0 | 4.0 | 20.4 |
| 33.4 | 49.9 | 92.7 | 581 | 4.1 | 5.0 | 16.3 |
| 27.8 | 43.4 | 93.7 | 590 | 2.6 | 6.0 | 16.3 |
| 30.3 | 44.8 | 93.5 | 588 | 3.0 | 7.0 | 15.3 |
| 58.5 | 52.7 | 92.3 | 586 | 3.3 | 8.0 | 14.3 |
| 78.7 | 53.9 | 92.1 | 589 | 2.8 | 9.0 | 18.7 |

These results indicate that barium precipitation is fairly independent of pH, although a slightly greater percentage of total barium was precipitated at pHs near neutral (a pH of 6 or 7) than acidic (a pH of 4 or 5) or caustic (a pH of 8 or 9). A slight decrease in strontium precipitation appeared to occur as the pH of the aqueous solution was increased.

Step 3:

The final step in the sulfate precipitation testing was to determine the impact of additional retention time on the precipitation results. This testing was performed with the addition of 120 percent of the calculated stoichiometric sulfate dose required to precipitate the measured amount of barium. The reaction was performed at a pH of 6.5. After each retention time noted in Table 6 below a portion of the sample was removed, and the pH of the removed portion was increased to 6.8 with caustic. The pH adjusted removed samples were filtered to remove the solids.

TABLE 6

Retention Time Testing Results

| Retention Time (minutes) | SO$_4$ (mg/L) | Ba (mg/L) | Sr (mg/L) | Ca (mg/L) | Fe (mg/L) | pH (S.U.) | Settleable Solids (ml/L) |
|---|---|---|---|---|---|---|---|
| 60 | 85.5 | 8.7 | 546 | 4,020 | 0.187 | 6.5 | — |
| 120 | 86.3 | 7.7 | 558 | 4,160 | 0.169 | — | — |
| 180 | 85.2 | 7.3 | 567 | 3,990 | 0.125 | 6.9 | — |
| 930 | 84.8 | 4.2 | 512 | 4,020 | 0.031 | 7.1 | — |
| 1440 | 83.4 | 3.9 | 532 | 4,020 | 0.022 | — | 15 |

From these results it can be seen that additional barium is removed with additional retention time, although the majority (98.7%) of the barium precipitated within the first 60 minutes. Similarly, strontium and iron removal also increased with increasing time, although there was only a minor increase in the amount precipitated to at retention times greater than 60 minutes. Calcium precipitation did not appear to increase with retention time.

The next part of the testing involved determining the performance of lime soda softening on the removal of residual barium, strontium, calcium, and magnesium.

Step 4—Testing of Softening Process:

Lime soda softening following the sulfate removal step and lime soda softening as a stand alone process were tested. To estimate an amount of lime/soda ash requirement to use to precipitate the various remaining contaminant elements from the test solution, a lime/soda ash stoichiometric calculation was used as follows:

TABLE 7

Calculation of Stoichiometric Quantities of Ca(OH)$_2$ and Na$_2$CO$_3$ to Precipitate Residual Contaminant Elements

| Element | Feed | Ca(OH)$_2$ (mg/L) | Na$_2$CO$_3$ (mg/L) |
|---|---|---|---|
| Ba (mg/L) | 685 | | 528.5 |
| Ca (mg/L) | 4,600 | | 12,190 |
| Fe (mg/L) | 37.3 | 49.3 | |
| Mg (mg/L) | 369 | 1,137.8 | 1629 |
| Mn (mg/L) | 1.03 | 1.4 | 2.7 |
| Sr (mg/L) | 606 | | 733.3 |
| Total | | 1,188.4 | 15,083.5 |

As a control, lime soda softening was used without the first step barium precipitation process then after the first step process but below the stoichiometric amount calculated as needed to precipitate all residual contaminants. Excess soda ash was then added to drive the carbonate precipitation processes to completion.

TABLE 8A

Lime Softening Test Results

| Sample no. | Sample Volume (ml) | NaSO$_4$ g | NaSO$_4$ g/L | Soda Ash g | Soda Ash g/L | Lime g | Lime g/L | pH Softened | pH Adjusted |
|---|---|---|---|---|---|---|---|---|---|
| 1 | 1,000 | | | | 13.89 | | 1.56 | 10.1 | 7 |
| 2 | 1,000 | | 0.638 | | 13.89 | | 1.56 | 10.2 | 7 |
| 3 | 750 | 0.479 | 0.639 | 11.9 | 15.87 | 1.17 | 1.56 | 10.8 | 7.00 |
| 4 | 750 | | 0 | 11.9 | 15.87 | 1.17 | 1.56 | 10.6 | 7.02 |
| 5 | 500 | 0.319 | 0.638 | 9.45 | 18.9 | 0.78 | 1.56 | 11.0 | 7.00 |
| 6 | 500 | | 0 | 9.45 | 18.9 | 0.78 | 1.56 | 11.0 | 7.02 |
| 7 | 500 | 0.319 | 0.638 | 11.9 | 23.8 | 0.78 | 1.56 | 11.3 | 7.02 |
| 8 | 500 | | 0 | 11.9 | 23.8 | 0.78 | 1.56 | 11.2 | 7.11 |

TABLE 8B

Lime Softening Test Results (Continued)

| Sample No. | SO$_4$ (mg/L) | Ba (mg/L) | Sr (mg/L) | Ca (mg/L) | Fe (mg/L) | Mg (mg/L) | Mn (mg/L) | Settleable Solids (ml/L) |
|---|---|---|---|---|---|---|---|---|
| 1 | <10 | 69.7 | 121 | 201 | <0.01 | 55.4 | <0.02 | 115 |
| 2 | 51 | 19.6 | 96.7 | 170 | <0.01 | 38.8 | <0.002 | 120 |
| 3 | 69.8 | 6.72 | 8.6 | 14.7 | <0.01 | 4.2 | <0.002 | 144 |
| 4 | <10 | 7.47 | 10.3 | 17.3 | <0.01 | 16.5 | <0.02 | 147 |
| 5 | 126 | 4.51 | 2.32 | 6.47 | <0.01 | 2.57 | <0.02 | 166 |
| 6 | <10 | 2.14 | 2.35 | 6.03 | <0.01 | 2.07 | <0.02 | 214 |
| 7 | 178 | 2.72 | 1.76 | 5.81 | <0.01 | 1.4 | <0.02 | 266 |
| 8 | <10 | 1.68 | 1.69 | 6.02 | <0.01 | <1.0 | <0.02 | 930 |

TABLE 8C

Lime Softening Test Results (Continued)

| Sample No. | Softening (amount of excess soda ash) |
|---|---|
| 1 | Lime softening below stoichiometric |
| 2 | 90% sulfate/softening below stoichiometric |
| 3 | 90% sulfate/softening with 2 g/L excess |
| 4 | Lime softening with 2 g/L excess |
| 5 | 90% sulfate/softening with 5 g/L excess |
| 6 | Lime softening with 5 g/L excess |
| 7 | 90% sulfate/softening with 10 g/L excess |
| 8 | Lime softening with 10 g/L excess |

These results indicate that as the excess soda ash amount was increased, the ions such as Ba, Sr, Ca, and Mg were removed to lower levels in the softening process.

Radioactivity Testing

A sample of the hydraulic fracturing wastewater characterized in Tables 1A and 1B above was tested after a number of different treatment procedures as indicated in Table 9 below to determine whether the radioactive content was removed from the water to be treated, and if removed, to determine the concentration of the radioactive content in the sludges removed.

TABLE 9

Radioactivity Removal Test Results

| Sample No. | Gross Alpha | Gross Beta | Radium-224 | Radium-226 | Test Procedure |
|---|---|---|---|---|---|
| 1 | 3,200 ± 300 | 840 ± 160 | 0 ± 20 | 1,600 ± 200 | Raw water |
| 2 | 0 ± 160 | 0 ± 200 | 14 ± 22 | 0 ± 13 | 120% NaSO₄ stirred 24 hours |
| 3 | 670 ± 230 | 160 ± 200 | 0 ± 17 | 390 ± 80 | Lime softening only |
| 4 | 70 ± 200 | 380 ± 200 | 6 ± 20 | 40 ± 30 | 90% NaSO₄ and lime softening |
| 5 | 30 ± 180 | 0 ± 200 | 0 ± 17 | 24 ± 26 | 120% NaSO₄ and NaF stirred 24 hours |

This test showed that removal of radioactive content is significant for each of the treatment procedures utilized. The decrease in radioactivity for the samples stirred 24 hours indicates that retention time (sludge contact time with the water) may be a factor in the removal of radioactive contaminants. Precipitation of barium with sulfate seems to be more effective than lime softening for removing radioactive materials (97.5 percent of Ra 226 removed with 90 percent sodium sulfate precipitation only vs. 75.6 percent with softening only).

Additional Barium Precipitation Tests:

Additional testing was done on the sulfate precipitation of barium to determine the amount of barium that should be precipitated to remove the Ra 226 and also to determine the radioactive content of the sludges created at different sulfate dose levels.

This additional testing involved adjusting the pH of three one liter samples of feed liquid to a pH of 3. The samples were each stirred for 20 minutes and allowed to settle for one hour. The solids were then filtered and both the filtered solids and remaining liquid were tested for barium and Ra 226 remaining Radium in the sludge was checked using test method SM 7500-Ra B. Radium in the liquid was also checked using SM 7500-Ra B.

TABLE 10A

Additional SO₄ Testing Results (Continued)

| Sample No. | NaSO₄ Added (mg) | Dry Weight of Filtered Solids (g) | Ba in Liquid (mg/L) | % Ba Removed from liquid | Ba in Dry Solids (mg/kg) |
|---|---|---|---|---|---|
| 1 | 31.0 | 0.498 | 562 | 18.0% | 53,400 |
| 2 | 310 | 1.066 | 346 | 49.5% | 31,500 |
| 3 | 620 | 1.354 | 87.9 | 87.2% | 35,800 |

TABLE 10B

Additional SO₄ Testing Results (Continued)

| Sample No. | Feed Sample Ra 226 (pCi/L) | ppm of NaSO₄ Added | Effluent Sample Ra 226 (pCi/L) | Ra 226 Removed (pCi/L), % | Calculated pCi/g |
|---|---|---|---|---|---|
| 1 | 1,600 | 31 | 1,800 | −200 (−12.4%) | −401.6 |
| 2 | 1,600 | 310 | 720 | 880 (55%) | 825.5 |
| 3 | 1,600 | 620 | 84 | 1516 (95%) | 1,119.7 |

The level of uncertainty on the feed and on the 1,800 pCi effluent samples is +/−200 pCi/L. The level of uncertainty on the 720 pCi effluent sample is +/−110 pCI/L. The level of uncertainty on the 84 pCi effluent sample is +/−39 pCi/L.

These results show that an approximately 50% stoichiometric sulfate to barium amount removed about 50% of the barium and a little over 50% of the radioactivity from the sample. Increasing the sulfate to about a 100% stoichiometric sulfate to barium ratio increased the barium removal to about 88% and the radioactivity removal to about 95%. This test confirms that there is a strong correlation between barium removal and radiation removal.

Table 11 below shows the estimated quantity and radioactive content of the sludge if softening alone was used to remove solids from the feed water and 75 percent of the NORM was removed.

In summary, the two-step process for a 100 gpm system would create 1.6 tons of 1,119 picocuries per gram sludge and 17 tons of 3 picocuries per gram of Ra 226 sludge vs. 18 tons per day of 40 picocuries per gram sludge.

TABLE 11

Stoichiometric Approach for Calculation of Softening Sludge Only

| Element | Feed | Ca(OH)$_2$ | Na$_2$CO$_3$ | Solids Formed (mg/L) | Picocuries per liter removed | Picocuries per gram dry sludge | Picocuries per gram wet sludge (assume 50% D. S. cake) |
|---|---|---|---|---|---|---|---|
| Ba (mg/L) | 685 | | 528.5 | 984.13 | | | |
| Ca (mg/L) | 4,600 | | 12,190 | 11,465 | | | |
| Fe (mg/L) | 37.3 | 49.3 | | 71.27 | | | |
| Mg (mg/L) | 369 | 1,137.8 | 1629 | 1,460.63 | | | |
| Mn (mg/L) | 1.03 | 1.4 | 2.7 | 1.67 | | | |
| Sr (mg/L) | 616 | | 733.3 | 1,037.92 | | | |
| Ra 226 (pCi/L) | 1,600 | | | | | | |
| Total | | 1,188.4 | 15,083.5 | 15,020.61 | 1,210 | 80.56 | 40.28 |

Sludge generated by softening alone would contain 40 picocuries per gram wet sludge. This would correspond to a 40 microrem per hour radiation level.

The 40 microrem per hour sludge reading would not classify the sludge as a class 7 sludge, but disposal of the sludge in landfill may be a concern for a 100 gallon per minute (gpm) mobile type system. This results in 18,024 pounds per day of this sludge or at 50 percent dry solids, 18 tons per day of material.

By using the two-step process, a much smaller quantity of the first step treatment sludge would be generated. For example, at a 620 mg/L sodium sulfate to dose, 1.354 g/L of barium sulfate sludge formed which would contain a maximum of 1,119 picocuries per gram of Ra 226. For a 100 gpm system, this would be 1,624 pounds per day of this sludge or at 50 percent dry solids, 1.6 tons per day of material.

The remainder of the sludge could be removed by softening as shown in Table 12 below:

TABLE 12

Stoichiometric Approach for Calculation of Softening Sludge Only

| Element | Feed | Ca(OH)$_2$ | Na$_2$CO$_3$ | Solids Formed (mg/L) | Picocuries per liter removed | Picocuries per gram dry sludge | Picocuries per gram wet sludge (assume 50% D. S. cake) |
|---|---|---|---|---|---|---|---|
| Ba (mg/L) | 87.9 | | 67.81 | 126.28 | | | |
| Ca (mg/L) | 4,600 | | 12,190 | 11,465 | | | |
| Fe (mg/L) | 37.3 | 49.3 | | 71.27 | | | |
| Mg (mg/L) | 369 | 1,137.8 | 1629 | 1,460.63 | | | |
| Mn (mg/L) | 1.03 | 1.4 | 2.7 | 1.67 | | | |
| Sr (mg/L) | 616 | | 733.3 | 1,037.92 | | | |
| Total | | 1,188.4 | 14,622.8 | 14,162.76 | 84 | 5.93 | 2.97 |

Sludge generated by softening in the second step of the process would contain 2.97 picocuries per gram wet sludge. This would correspond to a 3 microrem per hour radiation level.

This quantity of sludge for a 100 gpm system would be 16,994 pounds per day of dry solids or 17 tons per day of 50 percent dry solids sludge with 3 picocuries per gram of Ra 226.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A controlled method of minimizing radioactive sludge generation in post stimulation flowback and/or produced water treatment from a saltwater, oil, and/or gas well comprising:

measuring a concentration of a radioactive material in wastewater to be treated comprising flowback and/or produced water;

measuring a concentration of barium in the wastewater to be treated;

adding a calculated quantity of sulfate to the wastewater to be treated sufficient to reduce the concentration of the radioactive material to a level such that a second sludge precipitated in a secondary precipitation has a radiation level below a defined radiation level;

precipitating barium sulfate and the radioactive material from the wastewater to be treated to form a radioactive sludge and a partially treated wastewater; and performing the secondary precipitation on the partially treated wastewater to form the second sludge and a treated wastewater.

2. The method of claim 1, wherein if sufficient barium is not present in the wastewater to be treated to achieve a desired radiation level in the second sludge, additional barium is added to the wastewater prior to adding sulfate to facilitate producing the second sludge with the desired radiation level.

3. The method of claim 2, wherein the additional barium is in the form of barium chloride.

4. The method of claim 1, wherein the radioactive material is one of radium and cesium.

5. The method of claim 1, wherein the secondary precipitation comprises softening.

6. The method of claim 5, wherein softening comprises contacting the partially treated wastewater with one or more of caustic soda, soda ash, and lime.

7. The method of claim 1, wherein the defined radiation level is about 10 microrem per hour.

8. The method of claim 1, further comprising blending a quantity of the radioactive sludge with a quantity of the second sludge to produce a third sludge, the ratio of the quantity of the radioactive sludge to the quantity of the second sludge selected such that the third sludge has a radiation level below a second defined radiation level.

9. The method of claim 8, wherein the second defined radiation level is about 10 microrem per hour.

10. The method of claim 1, further comprising measuring a concentration of dissolved solids in at least one of the wastewater to be treated and the partially treated wastewater.

11. A computer-readable storage device containing a set of instructions which when executed on a controller of a wastewater treatment system configured to treat wastewater including post stimulation flowback and/or produced water from a saltwater, oil, and/or gas well causes the controller to perform a method comprising:
measuring a concentration of a radioactive material in wastewater to be treated comprising flowback and/or produced water;
measuring a concentration of barium in the wastewater to be treated;
adding a calculated quantity of sulfate to the wastewater to be treated sufficient to reduce the concentration of the radioactive material to a level such that a second sludge precipitated in a secondary precipitation has a radiation level below a defined radiation level;
precipitating barium sulfate and the radioactive material from the wastewater to be treated to form a radioactive sludge and a partially treated wastewater; and
performing the secondary precipitation on the partially treated wastewater to form the second sludge and a treated wastewater.

* * * * *